United States Patent [19]

Koch et al.

[11] Patent Number: 4,981,329
[45] Date of Patent: Jan. 1, 1991

[54] NON MOVING WHEEL COVER

[76] Inventors: Paul E. Koch, 4728 Rhode Island, Hyattsville, Md. 20781; George Spector, 233 Broadway #3815, New York, N.Y. 10007

[21] Appl. No.: 430,779
[22] Filed: Nov. 2, 1989
[51] Int. Cl.⁵ .............................................. B60B 7/00
[52] U.S. Cl. .............................. 301/37 N; 301/37 SC; 301/37 R
[58] Field of Search ............ 301/37 R, 37 P, 37 CM, 301/37 N, 37 S, 37 SC, 108 R, 108 A, 108 SC, 108 TW

[56] References Cited

U.S. PATENT DOCUMENTS

| | | | |
|---|---|---|---|
| 2,548,070 | 4/1951 | Ryan | 301/37 N |
| 2,935,361 | 3/1960 | Aske | 301/37 N |
| 3,495,347 | 2/1970 | Sims | 301/37 N X |
| 3,671,076 | 6/1972 | Aske, Jr. | 301/37 P |
| 3,810,679 | 5/1974 | Myers | 301/37 N X |

FOREIGN PATENT DOCUMENTS 1178763  5/1959  France ............................. 301/37 R Primary Examiner—Russell D. Stormer

[57] ABSTRACT

A stationary wheel cover assembly for a motor vehicle is provided and consists of a mounting flange affixed to the threaded end of a spindle in the motor vehicle. A cover plate having indicia carried on outer surface thereof is secured to the mounting flange so that when a wheel rim with a tire connected to a hub on the spindle rotates the cover plate will be stationary allowing the indicia to be viewed thereon.

2 Claims, 1 Drawing Sheet

4,981,329

NON MOVING WHEEL COVER

BACKGROUND OF THE INVENTION

The instant invention relates generally to non-rotatable hub caps and more specifically it relates to a stationary wheel cover assembly for a motor vehicle.

There are available conventional non-rotatable hub caps of various designs but which do not provide the novel improved functions and structure of the invention herein disclosed.

SUMMARY OF THE INVENTION

A primary object of the present invention is to provide a stationary wheel cover assembly for a motor vehicle that will overcome the shortcomings of the prior art devices.

Another object is to provide a stationary wheel cover assembly for a motor vehicle in which a mounting flange holding a cover plate is coupled to a spindle of a wheel assembly of the motor vehicle so that the cover plate will not rotate with respect to the wheel assembly.

An additional object is to provide a stationary wheel cover assembly for a motor vehicle that includes a dust cover which is attached to rear of the mounting flange and extends across to the rim of the wheel assembly so as to prevent dust and dirt from entering therebetween.

A further object is to provide a stationary wheel cover assembly for a motor vehicle that is simple and easy to use.

A still further object is to provide a stationary wheel cover assembly for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
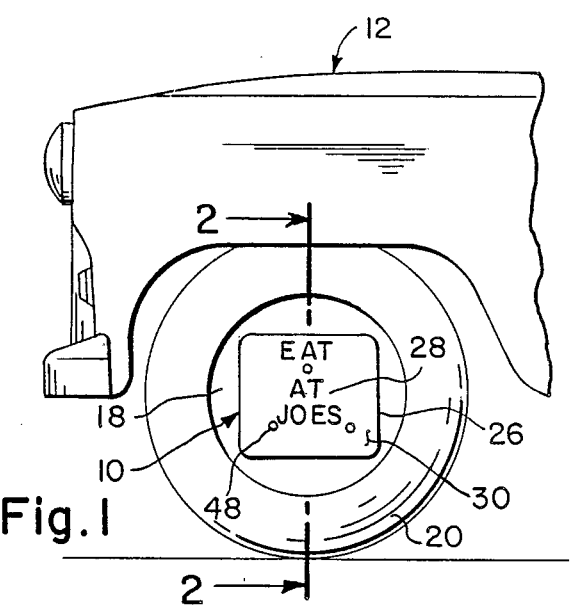
FIG. 1 is a side view of a portion of a motor vehicle showing the front wheel and the invention.
Figure 3:
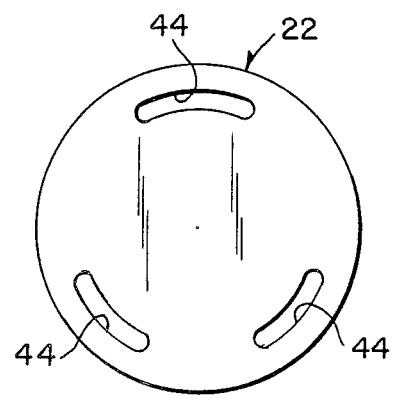
FIG. 3 is a front view of the mounting flange taken along line 3—3 in FIG. 2, showing the slotted holes therethrough.
Figure 2:
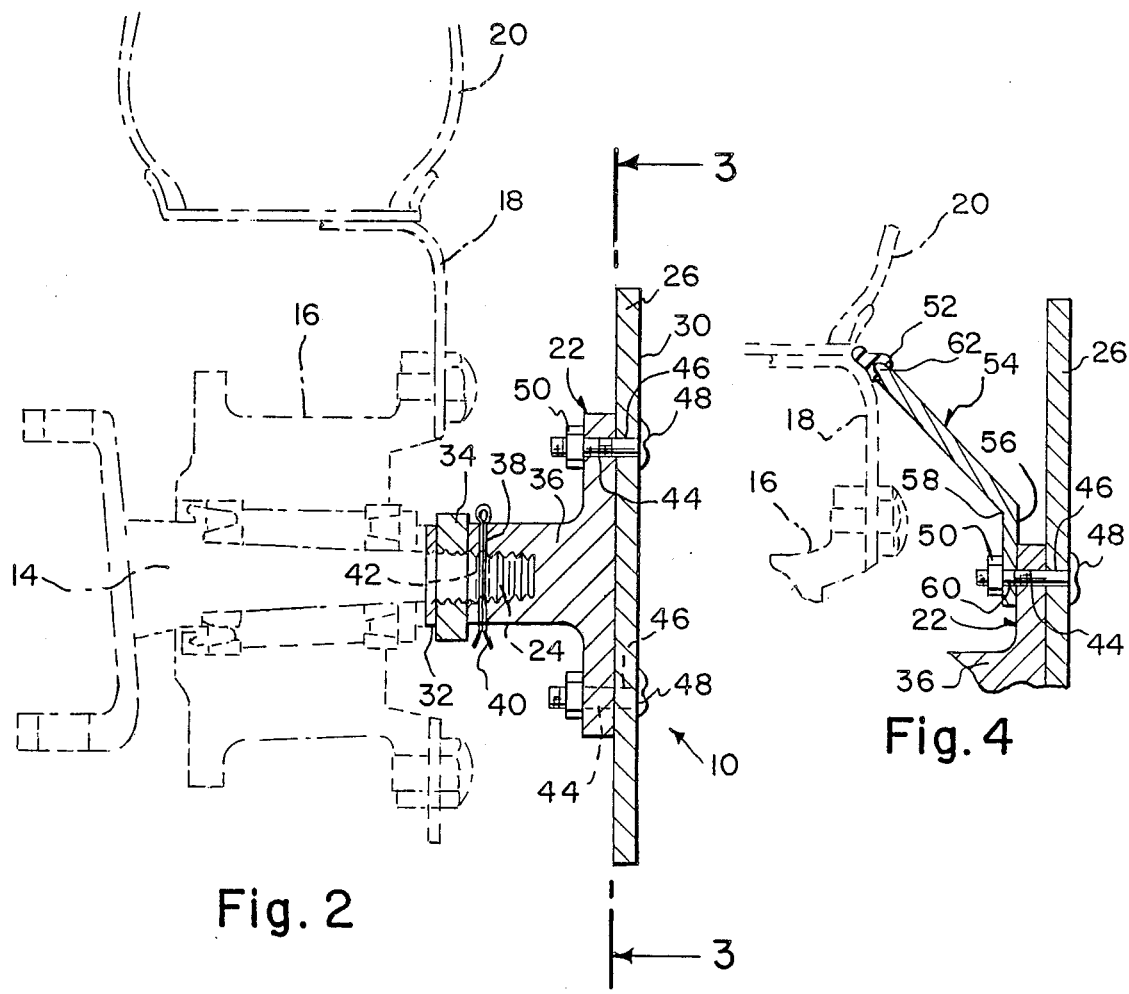
FIG. 2 is an enlarged cross sectional view taken along line 2—2 in FIG. 1, showing the invention mounted on the front wheel spindle.

Turning now descriptively to the drawings, in which similar reference characters denote similar elements throughout the several views, FIGS. 1 and 2 illustrate a stationary wheel cover assembly 10 for a motor vehicle 12 of the type having a spindle 14, a hub 16 rotatable on the spindle 14, a wheel rim 18 removably mounted on the hub 16 and a tire 20 mounted on the wheel rim 18.

The assembly 10 contains a mounting flange 22 affixed on threaded end 24 of the spindle 14. A cover plate 26 is provided having indicia 28 carried on outer surface 30 thereof and is secured on the mounting flange 22 so that when the wheel rim 18 with the tire 20 rotates the cover plate 26 will be stationary allowing the indicia 28 to be viewed thereon.

To affix the mounting flange 22 on the threaded end 24 of the spindle 14 a D-shaped washer 32 is placed onto the threaded end 24 of the spindle 14. A dust cap 34 is placed onto the threaded end 24 of the spindle 14 against the D-shaped washer 32. The mounting flange 22 has an internally threaded neck 36 with a transverse hole 38 therethrough so that the internally threaded neck 36 can screw onto the threaded end 24 of the spindle 14 against the dust cap 34. A cotter pin 40 is placed through the transverse hole 38 in the internally threaded neck 36 of the mounting flange 22 and a transverse hole 42 in the spindle 14 to keep the mounting flange 22 stationary thereto.

The mounting flange 22 has a plurality of annularly spaced apart curved slots 44 therethrough. The cover plate 30 has a plurality of holes 46 therethrough. A bolt 48 extends through each hole 46 in the cover plate 26 and through each slot 44 in the mounting flange 22. A nut 50 is threaded onto shank of each bolt 48 so as to hold the cover plate 26 to the mounting flange 22 in a proper position thereto.

Figure 4:
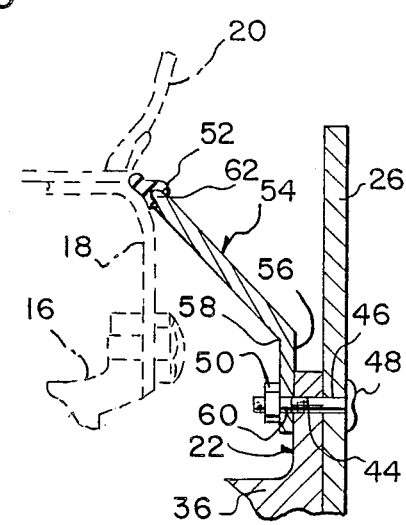
FIG. 4 is a cross sectional view similar to FIG. 2, with parts broken away showing a modification in which a dust cover is provided attached to back of the mounting flange and extending across to the front wheel rim.

FIG. 4 shows a modification in which an annular bearing seal 52 attached to the wheel rim 18 so that the bearing seal 52 can rotate with the wheel rim 18. A frustum conical shaped dust cover 54 with an annular inwardly facing flat rim 56 about smaller edge 58 thereof is provided. The rim 56 has a plurality of apertures 60 therethrough which match up with the slots 44 in the mounting flange 22 so that the bolts 48 and nuts 50 can secure the rim 56 to the rear of the stationary mounting flange 22. The dust cover 54 extends across allowing wider edge 62 to nest with the bearing seal 52, thus preventing dust and dirt from entering therebetween.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A stationary wheel cover assembly for a motor vehicle of the type having a spindle, a hub rotatable on the spindle; a wheel rim removably mounted on the hub and a tire mounted on the wheel rim, said assembly comprising;

(a) a mounting flange;

(b) means for affixing said mounting flange on threaded end of the spindle;

(c) a cover plate having indicia carried on outer surface thereof;

(d) means for securing said cover plate on said mounting flange so that when the wheel rim with the tire rotates said cover plate will be stationary allowing the indicia to be viewed thereon; wherein said affixing means includes:

(e) a D-shaped washer placed onto the threaded end of the spindle;

(f) a dust cap placed onto the threaded end of the spindle against said D-shaped washer;

(g) said mounting flange having an internally threaded neck with a transverse hole therethrough so that said internally threaded neck can screw onto the threaded end of the spindle against said dust cap; and (h) a cotter pin placed through the transverse hole in the internally threaded neck of said mounting flange and a transverse hole in the spindle to keep said mounting flange stationary thereto; wherein said securing means includes;

(i) said mounting flange having a plurality of annularly spaced apart curved slots therethrough;

(j) said cover plate having a plurality of holes therethrough;

(k) a plurality of bolts, each extending through one hole in said cover plate and through one slot in said mounting flange; and (l) a plurality of nuts, each threaded onto shank of each said bolt so as to hold said cover plate to said mounting flange in a proper position thereto.

2. A stationary wheel cover assembly as recited in claim 1, further including:

(a) an annular bearing seal attached to the wheel rim so that said bearing seal can rotate with the wheel rim; and (b) a frustum conical shaped dust cover with an annular inwardly facing flat rim about smaller edge thereof, the rim having a plurality of apertures therethrough which match up with the slots in said mounting flange so that said bolts and nuts can secure the rim to rear of said stationary mounting flange with the dust cover extending across allowing wider edge to nest with said bearing seal, thus preventing dust and dirt from entering there between.

* * * * *